(12) United States Patent
Saitou et al.

(10) Patent No.: US 8,039,409 B2
(45) Date of Patent: Oct. 18, 2011

(54) TIO$_2$-CONTAINING SILICA GLASS FOR OPTICAL MEMBER FOR EUV LITHOGRAPHY

(75) Inventors: Kenta Saitou, Tokyo (JP); Akio Koike, Tokyo (JP); Mitsuhiro Kawata, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/904,236

(22) Filed: Oct. 14, 2010

(65) Prior Publication Data

US 2011/0028299 A1 Feb. 3, 2011

Related U.S. Application Data

(63) Continuation of application No. PCT/JP2009/058028, filed on Apr. 16, 2009.

(30) Foreign Application Priority Data

Apr. 16, 2008 (JP) ................................. 2008-106747

(51) Int. Cl.
*C03C 3/06* (2006.01)
*C03C 3/076* (2006.01)

(52) U.S. Cl. ............................................ 501/54; 501/55

(58) Field of Classification Search .................... 501/53, 501/54, 55
See application file for complete search history.

(56) References Cited

U.S. PATENT DOCUMENTS

| | | | |
|---|---|---|---|
| 7,294,595 B2 | 11/2007 | Iwahashi et al. | |
| 7,410,922 B2 | 8/2008 | Iwahashi et al. | |
| 7,419,924 B2 | 9/2008 | Koike et al. | |
| 7,429,546 B2 | 9/2008 | Iwahashi et al. | |
| 7,462,574 B2 | 12/2008 | Iwahashi et al. | |
| 7,538,052 B2 | 5/2009 | Iwahashi et al. | |
| 7,585,800 B2 | 9/2009 | Kawata et al. | |
| 7,592,063 B2 | 9/2009 | Ikuta et al. | |
| 2002/0157421 A1 | 10/2002 | Ackerman et al. | |
| 2007/0042893 A1* | 2/2007 | Koike et al. | 501/54 |
| 2007/0207911 A1 | 9/2007 | Koike et al. | |
| 2008/0103038 A1* | 5/2008 | Kawata et al. | 501/54 |
| 2009/0122281 A1 | 5/2009 | Iwahashi et al. | |
| 2010/0089096 A1 | 4/2010 | Tamitsuji et al. | |
| 2010/0234205 A1 | 9/2010 | Ikuta et al. | |

FOREIGN PATENT DOCUMENTS

| | | |
|---|---|---|
| EP | 1 795 506 | 6/2007 |
| GB | 1 213 603 | 11/1970 |
| JP | 60-176945 | 9/1985 |
| JP | 2007/238425 | 9/2007 |
| JP | 2008-247631 | 10/2008 |
| WO | 2004/089838 | 10/2004 |
| WO | 2005/066090 | 7/2005 |
| WO | 2006/004169 | 1/2006 |
| WO | 2007/032533 | 3/2007 |
| WO | WO 2007/032533 A1 * | 3/2007 |
| WO | 2008/156177 | 12/2008 |

OTHER PUBLICATIONS

International Search Report issued Aug. 10, 2009, in PCT/JP09/058028 filed Aug. 18, 2009.
U.S. Appl. No. 12/868,900, filed Aug. 26, 2010, Koike, et al.

* cited by examiner

*Primary Examiner* — Jerry A Lorengo
*Assistant Examiner* — Noah Wiese
(74) *Attorney, Agent, or Firm* — Oblon, Spivak, McClelland, Maier & Neustadt, L.L.P.

(57) ABSTRACT

The present invention provides a TiO$_2$-containing silica glass from which a transparent extremely low thermal expansion glass having excellent transparency and having a temperature region in which the coefficient of thermal expansion is substantially zero can be obtained. The present invention relates to a TiO$_2$-containing silica glass for optical member for EUV lithography, having a TiO$_2$ concentration of from 3 to 14% by mass; an internal transmittance per 1-mm thickness in a wavelength region of from 400 to 700 nm, $T_{400\text{-}700}$, of 97% or more; and an internal transmittance per 1-mm thickness in a wavelength region of from 400 to 3,000 nm, $T_{400\text{-}3,000}$, of 70% or more.

16 Claims, No Drawings

TIO₂-CONTAINING SILICA GLASS FOR OPTICAL MEMBER FOR EUV LITHOGRAPHY

TECHNICAL FIELD

The present invention relates to a $TiO_2$-containing silica glass (hereinafter referred to as "$TiO_2$—$SiO_2$ glass") and relates to a transparent extremely low thermal expansion glass to be used as an optical member of an exposure tool which is used for EUV lithography (hereinafter referred to as "EUVL"). Also, the invention relates to a $TiO_2$-containing silica glass suitable for use in various materials which are strictly require to have low thermal expansion properties and transparency, for example, optical member materials, precision member materials such as standards for precision measurement, various electronic materials and the like. The EUV (extreme ultraviolet) light in the invention refers to light having a waveband in a soft X-ray region or in a vacuum ultraviolet region and specifically means light having a wavelength of from about 0.2 to 100 nm.

BACKGROUND ART

In recent years, in photolithography technology, with the trend toward a higher degree of integration and a higher function of an integrated circuit, the refinement of the integrated circuit is advancing. The exposure tool is hence required to form a circuit pattern image with high resolution on a wafer surface at a long focal depth, and shortening of the wavelength of an exposure light source is being advanced. The exposure light source is further advancing from conventional g-line (wavelength: 436 nm), i-line (wavelength: 365 nm) and a KrF excimer laser (wavelength: 248 nm), and an ArF excimer laser (wavelength: 193 nm) is coming to be employed. Also, in order to cope with a next-generation integrated circuit whose circuit pattern line width will become 100 nm or less, use of an $F_2$ laser (wavelength: 157 nm) as an exposure light source is regarded as being leading. However, it is considered that even this would be able to cover only the generation with a line width of up to 45 nm.

Under these circumstances, a lithographic technique employing typically a light having a wavelength of 13 nm among EUV lights (extreme ultraviolet light) as the exposure light source is considered to be applicable over the plurality of generations of 45 nm or finer and has attracted attention. The principle of image formation of EUVL is identical with that of the conventional lithography from the viewpoint that a mask pattern is transferred using a projection optical system. However, since there is no material capable of transmitting light therethrough in the EUV light energy region, a refractive optical system cannot be used. Accordingly, the optical systems are all a reflecting optical system.

The optical member of an exposure tool to be used for EUVL is basically configured with (1) a substrate, (2) a reflective multilayer formed on the substrate and (3) an absorber layer formed on the reflective multilayer. The optical member for an exposure tool to be used for EUVL is a reflection type, and thus, the substrate is not necessarily required to have translucency. However, an extremely low thermal expansion material having transparency has been desired so as to make evaluation or inspection possible for the purpose of evaluating the homogeneity or the surface smoothness by using an interferometer, etc. so that the substrate will not deform even when irradiated with EUV light, or for the purpose of determining the presence or absence of internal defects such as bubbles or striae by microscopic or visual inspection.

Also, a transparent low thermal expansion material is widely used for various materials which are strictly required to have low thermal expansion properties and transparency, for example, optical member materials, materials for a ring laser gyroscope, precision member materials such as standards for precision measurement, various electronic materials and the like.

The extremely low expansion material having transparency includes a $TiO_2$-containing silica glass represented by ULE #7972 (trade name) manufactured by Corning Incorporated and a transparent crystallized glass represented by ZERODUR (trade name) manufactured by SCHOTT AG.

There is a U.S. patent application which discloses a method including forming a $TiO_2$—$SiO_2$ porous glass body, converting it to a glass body and then obtaining a mask substrate (see, for example, Patent Document 1).

The $TiO_2$—$SiO_2$ glass is known as an extremely low thermal expansion material having a coefficient of thermal expansion lower than that of silica glass. Also, since the coefficient of thermal expansion can be controlled by the $TiO_2$ content in the glass, a zero-expansion glass whose coefficient of thermal expansion is close to 0 can be obtained. Accordingly, the $TiO_2$—$SiO_2$ glass involves a possibility as a material to be used in an optical member of an exposure tool for EUVL. However, since it contains a large amount of an OH group, there are absorptions at several wavelengths, e.g., near 2,700 nm. Furthermore, since it contains $Ti^{3+}$, there is an absorption at a wavelength in the visible region.

On the other hand, a crystallized glass is composed of a crystalline phase exhibiting negative thermal expansion and a glass phase exhibiting positive thermal expansion, and can be a zero-expansion material having a coefficient of thermal expansion of close to zero by controlling a heat step for crystallization. Also, since the crystal grain is small and since the difference in refractive index between the crystalline phase and the glass phase as a matrix is small, it becomes transparent. Accordingly, there is a possibility to obtain a material having excellent thermal expansion characteristics by contriving the composition of a mother glass or a heat treatment step. However, since the change in dimension relative to a change in temperature exhibits hysteresis due to structural relaxation, the crystallized glass has a problem in absolute dimensional accuracy. Furthermore, since the crystallized glass has absorption in the visible region, it was not suitable for the evaluations of homogeneity, surface smoothness and internal defects, which necessitate high transparency in the visible region. Furthermore, an optical member of an exposure tool to be used for EUVL is required to have an extremely smooth surface, e.g., a surface roughness Ra of 0.15 nm or less. However, there was a problem that a smooth surface is hardly obtained due to influences of the crystal grains.

As the extremely low thermal expansion material, there is a silica glass containing Sn and Ti (hereinafter referred to as "$SnO_2$—$TiO_2$—$SiO_2$ glass"). It has been disclosed a method including forming an $SnO_2$—$TiO_2$—$SiO_2$ porous glass body, converting it to a glass body and then obtaining a mask substrate (see, for example, Patent Document 2).

The $SnO_2$—$TiO_2$—$SiO_2$ glass is known as an extremely low thermal expansion material having a coefficient of thermal expansion lower than that of silica glass. Also, since the coefficient of thermal expansion can be controlled by the $SnO_2$ content or the $TiO_2$ content in the glass, a zero-expansion glass whose coefficient of thermal expansion is close to 0 can be obtained.

Accordingly, the $SnO_2$—$TiO_2$—$SiO_2$ glass involves a possibility as a material to be used in an optical member of an exposure tool for EUVL. However, since the $SnO_2$—$TiO_2$—$SiO_2$ glass disclosed in Patent Document 2 has $SnO_2$ concentration distribution in the glass, it involves a local fluctuation of coefficient of thermal expansion and a local fluctuation of refractive index. Furthermore, since an $SnO_2$ crystal is easily deposited due to influences of the $SnO_2$ concentration distribution, there were problems that a thorough temperature control must be carried out in order to prevent the transmittance from lowering and obtain a smooth surface.

Citation List

Patent Literature

Patent Document 1: US-A-2002/157421
Patent Document 2: JP-A-2007-238425

SUMMARY OF INVENTION

It is preferred that optical members of an exposure tool for EUVL as well as optical member materials, precision member materials such as standards for precision measurement, various electronic materials and the like have high transparency for the purpose of being evaluated in terms of homogeneity, surface smoothness and internal defects. However, since the conventional $TiO_2$—$SiO_2$ glass has absorption in the visible region due to the existence of $Ti^{3+}$, the evaluation methods were limited. Also, the conventional crystallized glass had a problem in absolute dimensional accuracy since the dimensional change relative to a temperature change exhibits hysteresis due to structural relaxation; and also had a problem that a smooth surface is hardly obtained. Furthermore, since the conventional crystallized glass had absorption in the visible region, the evaluation methods of homogeneity, surface smoothness and internal defects were limited. Also, the conventional $SnO_2$—$TiO_2$—$SiO_2$ glass had a problem of involving a local fluctuation of coefficient of thermal expansion due to $SnO_2$ concentration distribution in the glass. Furthermore, the conventional $SnO_2$—$TiO_2$—$SiO_2$ glass easily causes precipitation of $SnO_2$ crystal, and hence there was a problem that it was difficult to prevent the transmittance from lowering and to obtain a smooth surface unless a thorough temperature control is carried out.

The invention provides a $TiO_2$-containing silica glass for optical member for EUV lithography, having a $TiO_2$ concentration of from 3 to 14% by mass; an internal transmittance per 1-mm thickness in a wavelength region of from 400 to 700 nm, $T_{400-700}$, of 97% or more; and an internal transmittance per 1-mm thickness in a wavelength region of from 400 to 3,000 nm, $T_{400-3000}$, of 70% or more.

The silica glass of the invention preferably has a $Ti^{3+}$ concentration, in terms of $TiO_2$, of 100 ppm by mass or less.

The silica glass of the invention preferably contains Sn, in terms of $SnO_2$, of from 0.01 to 10% by mass.

The silica glass of the invention which contains Sn, in terms of $SnO_2$, of from 0.01 to 10° A by mass, preferably has $Sn^{2+}/(Sn^{2+}+Sn^{4+})$ of 0.5 or less.

The silica glass of the invention which contains Sn, in terms of $SnO_2$, of from 0.01 to 10% by mass, preferably has a fluctuation width ($\Delta SnO_2$) of $SnO_2$ concentration of 0.5% by mass or less within an area of 10 mm×10 mm.

The silica glass of the invention preferably has a fluctuation width ($\Delta n$) of a refractive index of $2 \times 10^{-3}$ or less within an area of 10 mm×10 mm in at least one plane.

The silica glass of the invention preferably has a fluctuation width ($\Delta n$) of a refractive index of $2 \times 10^{-3}$ or less within an area of 10 mm×10 mm in each of two planes orthogonal to each other.

The silica glass of the invention preferably has a coefficient of thermal expansion in the temperature range of from 0 to 100° C., $CTE_{0-100}$, of from −150 ppb/° C. to 150 ppb/° C.

The silica glass of the invention preferably has a temperature width, in which the coefficient of thermal expansion is from −5 ppb/° C. to 5 ppb/° C., of 4.0° C. or greater.

The silica glass of the invention preferably has a fictive temperature of 1,200° C. or lower.

The silica glass of the invention preferably has an OH concentration of 600 ppm by mass or less.

According to the invention, it is possible to obtain a transparent extremely low thermal expansion glass having excellent transparency and having a temperature region in which a coefficient of thermal expansion is substantially zero. Accordingly, the silica glass of the invention is extremely favorable as a material of a member constituting an optical system to be used for EUVL. Also, the silica glass of the invention is favorable as a transparent extremely low expansion glass to be used for various materials which are strictly required to have low thermal expansion properties and transparency, for example, optical member materials, precision member materials such as standards for precision measurement, various electronic materials and the like.

DESCRIPTION OF EMBODIMENTS

The $TiO_2$—$SiO_2$ glass of the invention is a silica glass containing Ti in an amount of from 3 to 14% by mass in terms of $TiO_2$. When the $TiO_2$ content is less than 3% by mass, there is a concern that the zero expansion is not attained. The $TiO_2$ content is preferably 4% by mass or more, and especially preferably 5% by mass or more. Also, when the $TiO_2$ content exceeds 14% by mass, there is a concern that a $TiO_2$ crystal precipitates in the $TiO_2$—$SiO_2$ glass, thereby a homogenous $TiO_2$—$SiO_2$ glass cannot be obtained. The $TiO_2$ content is preferably 12% by mass or less, and especially preferably 10% by mass or less.

The present inventor made extensive and intensive investigations regarding the relationship among the Sn content, the $Ti^{3+}$ concentration and the transmittance in the wavelength region of from 400 to 700 nm. As a result, it has been found that when Sn is incorporated in the amount of from 0.01 to 10% by mass in terms of $SnO_2$, the $Ti^{3+}$ content becomes 100 ppm by mass or less in terms of $TiO_2$ and the transmittance of the $TiO_2$—$SiO_2$ glass in the wavelength region of from 400 nm to 700 nm increases.

The $TiO_2$—$SiO_2$ glass of the invention can contain Sn. Sn in the $TiO_2$—$SiO_2$ glass functions as a redox pair of Ti, thereby inhibiting the generation of $Ti^{3+}$. It is known that $Ti^{3+}$ has absorption in the visible region. In addition, when a large amount of $Ti^{3+}$ is present in the $TiO_2$—$SiO_2$ glass, the transmittance in the wavelength region of from 400 nm to 700 nm is reduced. Accordingly, what the incorporation of Sn in the $TiO_2$—$SiO_2$ glass is effective for reducing the $Ti^{3+}$ content and increasing the transmittance in the wavelength region of from 400 nm to 700 nm.

In the case where Sn is incorporated in the $TiO_2$—$SiO_2$ glass of the invention for the purpose of increasing the transmittance in the wavelength region of from 400 nm to 700 nm, it is preferred that the Sn content is in the amount of from 0.01 to 10% by mass in terms of $SnO_2$. When the Sn content is less than 0.01% by mass, there is a concern that the $Ti^{3+}$ content exceeds 100 ppm by mass in terms of $TiO_2$, and thus, there is a concern that the reduction of the transmittance in the wavelength region of from 400 nm to 700 nm cannot be sufficiently inhibited. The Sn content is preferably 0.05% by mass or more, and especially preferably 0.1% by mass or more.

Sn is present as $Sn^{2+}$ ion or $Sn^{4+}$ ion in the $TiO_2$—$SiO_2$ glass. The $Sn^{2+}$ ion has absorption in the visible region. Therefore, when a large amount of Sn is present as $Sn^{2+}$ ion in the $TiO_2$—$SiO_2$ glass, there is a concern that the transmittance in the wavelength region of from 400 nm to 700 nm becomes reduced.

In the case where Sn is all present as $Sn^{2+}$ in the $TiO_2$—$SiO_2$ glass, if the Sn content exceeds 10% by mass in terms of $SnO_2$, there is a concern that the reduction of the transmittance in the wavelength region of from 400 nm to 700 nm cannot be neglected. Taking this into consideration, the Sn content is preferably 7% by mass or less.

Also, when a large amount of Sn is present as $Sn^{4+}$ ion in the $TiO_2$—$SiO_2$ glass, there is a concern that an $SnO_2$ crystal precipitates in the $TiO_2$—$SiO_2$ glass, whereby a homogeneous $TiO_2$—$SiO_2$ glass cannot be obtained. In the case where Sn is all present as $Sn^{4+}$ in the $TiO_2$—$SiO_2$ glass, if the Sn content exceeds 4% by mass in terms of $SnO_2$, there is a concern that the precipitation of a $SnO_2$ crystal cannot be neglected. Taking this into consideration, the Sn content is more preferably 2% by mass or less, further preferably 1% by mass or less, and especially preferably 0.5% by mass or less.

Also, when a comparison is made between $Sn^{2+}$ and $Sn^{4+}$, $Sn^{2+}$ is effective for heightening the coefficient of thermal expansion, whereas $Sn^{4+}$ is effective for lowering the coefficient of thermal expansion. Accordingly, in the $TiO_2$—$SiO_2$ glass of the invention, $Sn^{2+}/(Sn^{2+}+Sn^{4+})$ is preferably 0.5 or less, and more preferably 0.2 or less. The ratio of $Sn^{2+}$ and $Sn^{4+}$ can be measured by means of the Moessbauer method.

Examples of components other than Sn, which inhibit the generation of $Ti^{3+}$ in the $TiO_2$—$SiO_2$ glass of the invention (hereinafter referred to as "$Ti^{3+}$-inhibiting component") include Eu, Ce, Sm and Cu. When the $Ti^{3+}$-inhibiting component is incorporated, the transmittance in the visible region can be increased due to $Ti^{3+}$. Some of the $Ti^{3+}$-inhibiting components have absorption in the visible region and therefore the transmittance is reduced if such a component is incorporated excessively.

The $Ti^{3+}$-inhibiting component can be incorporated in the $TiO_2$—$SiO_2$ glass of the invention. In the case where the $Ti^{3+}$-inhibiting component is incorporated in the $TiO_2$—$SiO_2$ glass of the invention, the component thereof is preferably from 0.01 to 5% by mass in terms of $Eu_2O_3$, $CeO_2$, $Sm_2O_3$ or CuO. When the content of the $Ti^{3+}$-inhibiting component is less than 0.01% by mass, there is a concern that the reduction of the transmittance in the wavelength region of from 400 nm to 700 nm due to $Ti^{3+}$ cannot be sufficiently inhibited. The content of the $Ti^{3+}$-inhibiting member is preferably 0.05% by mass or more, and especially preferably 0.1% by mass or more.

Also, when the content of the $Ti^{3+}$-inhibiting component exceeds 5% by mass, the absorption is caused due to the $Ti^{3+}$-inhibiting component, and thus, there is a concern that the transmittance in the wavelength region of from 400 nm to 700 nm is reduced. The content of the $Ti^{3+}$-inhibiting component is preferably 3% by mass or less, more preferably 2% by mass or less, and especially preferably 0.5% by mass or less.

With respect to a method for manufacturing a $TiO_2$—$SiO_2$ glass containing a $Ti^{3+}$-inhibiting component, the $TiO_2$—$SiO_2$ glass containing a $Ti^{3+}$-inhibiting component is obtained by soaking a porous $TiO_2$—$SiO_2$ glass body obtained by a soot process with a solution of a compound of a $Ti^{3+}$-inhibiting component, such as a chloride of a $Ti^{3+}$-inhibiting component and an alkoxide of a $Ti^{3+}$-inhibiting component, by means of a solution soaking process, drying it to remove the solvent and then heating the resulting glass body to a transparent vitrification temperature.

Examples of the solvent which can be used for preparing the solution of a chloride of a $Ti^{3+}$-inhibiting component, an alkoxide of a $Ti^{3+}$-inhibiting component or the like, include methanol, ethanol, isopropanol, toluene, normal hexane, benzene, xylene and the like.

In the case of an alkoxide of a $Ti^{3+}$-inhibiting component, it is preferred to use toluene or xylene having small polarity, or normal hexane or benzene having no polarity. For the purpose of preventing a reaction with moisture in air, it is preferred to soak the alkoxide of a $Ti^{3+}$-inhibiting component in an inert atmosphere of nitrogen, etc., and the dew point of the atmosphere is preferably made lower than 0° C.

The soaking may be carried out under a normal pressure or a reduced pressure. When the soaking is carried out under a reduced pressure, it is possible to shorten the time for penetrating the solution into the inside of the porous $TiO_2$—$SiO_2$ glass body. In the case where the pressure reduction is carried out, the pressure is preferably 13,000 Pa or lower. Although the temperature for removing the solvent is properly chosen depending upon the kind of the solvent, it is preferably 100° C. or higher.

The removal of the solvent may be carried out under a normal pressure or a reduced pressure. In the case where the removal of the solvent is carried out under a reduced pressure, the pressure is preferably 13,000 Pa or lower. The solvent can be removed by drying immediately after completion of the soaking with a solution. It is preferred that the porous glass body which has been taken out from the solvent is left at rest in an atmosphere having a dew point of 0° C. or higher, followed by removing the solvent. By utilizing such a method, a hydrolysis reaction between the alkoxide of a $Ti^{3+}$-inhibiting component and Si—OH in the inside of the glass body is accelerated. For that reason, the residual amount of the $Ti^{3+}$-inhibiting component can be increased and also the occurrence of the segregation of the $Ti^{3+}$-inhibiting component can be suppressed.

The time for keeping the porous glass body in the soaking process is preferably 24 hours or more. In order to accelerate the hydrolysis, an ammonium gas, a hydrochloric acid gas or the like may be introduced in the atmosphere.

The obtained porous $TiO_2$—$SiO_2$ glass body containing a $Ti^{3+}$-inhibiting component is heated to the transparent vitrification temperature, thereby obtaining a transparent $TiO_2$—$SiO_2$ glass body containing a $Ti^{3+}$-inhibiting component.

In the invention, a fluctuation width ($\Delta SnO_2$) of the $SnO_2$ concentration in 1 $cm^2$ is preferably 0.5% by mass or smaller. $SnO_2$ is a component which affects the coefficient of thermal expansion. When the $\Delta SnO_2$ exceeds 0.5% by mass, there is a concern that an $SnO_2$—$TiO_2$—$SiO_2$ glass having a heterogeneous coefficient of thermal expansion is produced, which is not suitable as an optical member of an exposure tool for EUVL. The $\Delta SnO_2$ is preferably 0.3% by mass or smaller, more preferably 0.2% by mass or smaller, especially preferably 0.1% by mass or smaller, and most preferably 0.01% by mass or smaller.

As a method for manufacturing an $SnO_2$—$TiO_2$—$SiO_2$ glass having a fluctuation width ($\Delta SnO_2$) of the $SnO_2$ concentration in 1 $cm^2$ of 0.5% by mass or smaller, the following method is exemplified: an $SnO_2$—$TiO_2$—$SiO_2$ glass fine particle (soot) obtained by flame hydrolysis or thermal decomposition of an Si precursor, a Ti precursor and an Sn precursor serving as glass-forming raw materials is deposited and grown on a substrate by a soot process, thereby obtaining a porous $SnO_2$—$TiO_2$—$SiO_2$ glass body; and the obtained porous $SnO_2$—$TiO_2$—$SiO_2$ glass body is heated to a transparent vitrification temperature, thereby obtaining a transparent $SnO_2$—$TiO_2$—$SiO_2$ glass body. A seed rod made by silica glass and the like is useful as the substrate.

The present inventor made extensive and intensive investigations regarding the relationship between the feed amounts of $SiCl_4$, $TiCl_4$ and $SnCl_4$ serving as glass-forming raw materials and the fluctuation width ($\Delta SnO_2$) of the $SnO_2$ concentration in 1 cm$^2$ at the stage of obtaining a porous $SnO_2$—$TiO_2$—$SiO_2$ glass body. As a result, it has been found that when the feed amount of $SnCl_4$ relative to the total hydrogen feed amount is reduced; the $\Delta SnO_2$ of the $SnO_2$—$TiO_2$—$SiO_2$ glass is reduced.

Specifically, the feed amount of $SnCl_4$ relative to the total hydrogen feed amount in forming a porous $SnO_2$—$TiO_2$—$SiO_2$ glass body is preferably $3\times10^{-3}$ g/L or less, more preferably $2\times10^{-3}$ g/L or less, and especially preferably $8\times10^{-4}$ g/L or less.

The $SnO_2$ concentration distribution can be measured by a fundamental parameter method with the use of, for example, fluorescent X-ray analysis (using an X-ray analyzer ZSX100e, manufactured by Rigaku Denki Kogyo Co., Ltd.). The fluctuation width ($\Delta SnO_2$) of the $SnO_2$ concentration can be derived from a difference between the maximum value and the minimum value obtained by carrying out the measurements of the $SnO_2$ concentration at 6×6 points with an X-ray irradiation area of 3-mm diameter at an interval of 2 mm within an area of 10 mm×10 mm.

In the invention, a $\Delta Ti^{3+}$-inhibiting component which is a fluctuation width of the concentration of the $Ti^{3+}$-inhibiting component in 1 cm$^2$ is preferably 0.5% by mass or less in terms of $Eu_2O_3$, $CeO_2$, $Sm_2O_3$ or CuO. The $Ti^{3+}$-inhibiting component is a component which affects the coefficient of thermal expansion. When the $\Delta Ti^{3+}$-inhibiting component exceeds 0.5% by mass, there is a concern that a $TiO_2$—$SiO_2$ glass having a heterogeneous coefficient of thermal expansion is produced, which is not suitable as an optical member of an exposure tool for EUVL. The $\Delta Ti^{3+}$-inhibiting component is preferably 0.3% by mass or smaller, more preferably 0.2% by mass or smaller, especially preferably 0.1% by mass or smaller, and most preferably 0.01% by mass or smaller.

With respect to a method for manufacturing a $TiO_2$—$SiO_2$ glass having a fluctuation width of the concentration of the $Ti^{3+}$-inhibiting component in 1 cm$^2$, $\Delta Ti^{3+}$-inhibiting component, of 0.5% by mass or smaller, there is a method including the step of soaking a porous $TiO_2$—$SiO_2$ glass body obtained by a soot process with a solution of a compound of a $Ti^{3+}$-inhibiting member, such as a chloride of a $Ti^{3+}$-inhibiting component and an alkoxide of a $Ti^{3+}$-inhibiting component, through a solution soaking process, drying it to remove the solvent and then heating the resulting glass body to a transparent vitrification temperature.

The present inventor made extensive and intensive investigations regarding the relationship between the $\Delta Ti^{3+}$-inhibiting component as a fluctuation width of the concentration of the $Ti^{3+}$-inhibiting component in 1 cm$^2$ and the soaking time at the stage of soaking with a solution of a compound of a $Ti^{3+}$-inhibiting component by a solution soaking process. As a result, it has been found that when the soaking time is increased, the $\Delta Ti^{3+}$-inhibiting component of the $TiO_2$—$SiO_2$ glass is reduced.

Specifically, the soaking time is preferably 4 hours or more, more preferably 12 hours or more, and especially preferably 24 hours or more. When the soaking time is less than 4 hours, the solution does not penetrate into the inside of the porous $TiO_2$—$SiO_2$ glass body, and thus, there is a concern that the $\Delta Ti^{3+}$-inhibiting component exceeds 0.5% by mass.

The concentration distribution of each of $Eu_2O_3$, $CeO_2$, $Sm_2O_3$ and CuO as the $Ti^{3+}$-inhibiting component can be measured by a fundamental parameter method with the use of, for example, fluorescent X-ray analysis (using an X-ray analyzer ZSX100e, manufactured by Rigaku Denki Kogyo Co., Ltd.). The $\Delta Ti^{3+}$-inhibiting component which is a fluctuation width of the concentration of the $Ti^{3+}$-inhibiting component can be derived from a difference between the maximum value and the minimum value of the concentration of each of $Eu_2O_3$, $CeO_2$, $Sm_2O_3$ and CuO obtained by carrying out the measurements of the concentration of the $Ti^{3+}$-inhibiting component at 6×6 points with an X-ray irradiation area of 3-mm diameter at an interval of 2 mm within an area of 10 mm×10 mm.

In the invention, an internal transmittance $T_{400-700}$ is 97% or more. When the internal transmittance $T_{400-700}$ is less than 97%, the visible light is easily absorbed, and therefore there is a possibility of the generation of inconvenience in inspection or evaluation such that it is difficult to discriminate the presence or absence of internal defects such as bubbles or striae by microscopic or visual inspection. Also, in the case of a member to be used upon passing visible light therethrough, since the intensity of transmitted light is reduced by the use, there is a possibility that the low internal transmittance $T_{400-700}$ impairs characteristics of the member. The internal transmittance $T_{400-700}$ is preferably 98% or more, and especially preferably 99% or more.

In the invention, an internal transmittance $T_{400-3000}$ is preferably 70% or more, and especially preferably 80% or more. When the internal transmittance $T_{400-3000}$ is less than 70%, there is a possibility that of causing an inconvenience in inspection or evaluation such that an inspection to control homogeneity or surface smoothness by a measurement instrument using a laser interferometer is hardly achieved. Also, in the case of a member to be used upon passing visible light or infrared light therethrough, since the intensity of transmitted light is reduced, there is a possibility that the internal transmittance $T_{400-3000}$ impairs characteristics of the member.

The transmittance is measured as follows. The measurement can be carried out with respect to a mirror-polished glass having a 1-mm thickness by using a spectrophotometer (U-3500, manufactured by Hitachi, Ltd.). The internal transmittance per 1-mm thickness is calculated by such a way that two samples having been mirror-polished to the same extent and having a different thickness from each other, for example, a sample having a 2-mm thickness and a sample having a 1-mm thickness, are measured for transmittance; after converting the transmittance to an absorbance, the absorbance of the sample having a 1-mm thickness is subtracted from the absorbance of the sample having a 2-mm thickness to determine an absorbance per 1-mm; and the absorbance is again converted to a transmittance. Thus the internal transmittance per 1-mm thickness can be determined.

Simply, the internal transmittance is calculated by the following method. A loss in transmittance of a silica glass having been mirror-polished to the same extent and having a thickness of about 1 mm at a wavelength where there is no absorption by the silica glass, for example, at a wavelength in the vicinity of 2,000 nm, is considered as a reflection loss at the front surface or the back surface. The loss in transmittance is converted to an absorbance, which is then defined as an absorbance of reflection loss at the front surface or the back surface. The transmittance of the measurement sample having a 1-mm thickness in a transmittance measurement wavelength region is converted to an absorbance, from which is subtracted an absorbance of the silica glass having a thickness of about 1 mm in the vicinity of 2,000 nm. The difference in the absorbance is again converted to a transmittance, thereby determining an internal transmittance.

The present inventor measured an absolute refractive index of various $SnO_2$—$TiO_2$—$SiO_2$ glasses having different concentrations of Ti and Sn to be incorporated. As a result, it has been found that the following formula is worked out among the $TiO_2$ concentration, the SnO concentration and the refractive index within a range where the $TiO_2$ concentration is 12% by mass or less, and the Sn amount is 10% by mass or less in terms of SnO.

(Absolute refractive index)=$3.27 \times 10^{-3} \times$($TiO_2$ concentration (% by mass))+$3.67 \times 10^{-3} \times$(SnO concentration (% by mass))+1.459  (1)

By using formula (1), the fluctuation width ($\Delta n$) of the refractive index of the $SnO_2$—$TiO_2$—$SiO_2$ glass can be determined from the Sn concentration and the Ti concentration.

In the invention, the fluctuation width ($\Delta n$) of the refractive index is preferably within $2 \times 10^{-3}$ within an area of 10 mm×10 mm in at least one plane. When the fluctuation width ($\Delta n$) of the refractive index exceeds $2 \times 10^{-3}$, since the polishing rate does not become constant, a reduction in the extremely high smoothness of the glass surface after polishing and a deterioration of the distribution of the coefficient of thermal expansion are caused. Thus, the glass is not suitable for an optical member of an exposure tool for EUVL. The fluctuation width ($\Delta n$) of the refractive index is preferably within $1 \times 10^{-3}$, more preferably within $7 \times 10^{-4}$, especially preferably within $4 \times 10^{-4}$, and most preferably within $4 \times 10^{-5}$.

In order to regulate the fluctuation width ($\Delta n$) of the refractive index to within $2 \times 10^{-3}$ within an area of 10 mm×10 mm in at least one plane, it is noted from formula (1) that, for example, in the case where a fluctuation in the SnO concentration within an area of 10 mm×10 mm is 0% by mass in terms of the SnO concentration, a fluctuation in the $TiO_2$ concentration within an area of 10 mm×10 mm must be within 0.6% by mass in terms of the $TiO_2$ concentration, whereas in the case where a fluctuation in the $TiO_2$ concentration within an area of 10 mm×10 mm is 0% by mass in terms of the $TiO_2$ concentration, a fluctuation in the SnO concentration within a range of 10 mm×10 mm must be within 0.5% by mass in terms of the SnO concentration.

In the invention, the fluctuation width ($\Delta n$) of the refractive index is preferably within $2 \times 10^{-3}$ within an area of 10 mm×10 mm in each of two planes orthogonal to each other. When the fluctuation width ($\Delta n$) of the refractive index exceeds $2 \times 10^{-3}$, since the polishing rate does not become constant, a reduction in the extremely high smoothness of the glass surface after polishing and a deterioration of the distribution of the coefficient of thermal expansion are caused. Thus, the glass is not suitable for an optical member of an exposure tool for EUVL. The fluctuation width ($\Delta n$) of the refractive index is preferably within $1 \times 10^{-3}$, more preferably within $7 \times 10^{-4}$, especially preferably within $4 \times 10^{-4}$, and most preferably within $4 \times 10^{-5}$.

The fluctuation width ($\Delta n$) of the refractive index is measured as follows. For example, a cube of about 40 mm×40 mm×40 mm is cut out from a $TiO_2$—$SiO_2$ glass body and then sliced into 1-mm thickness from each of the planes of the cube, thereby obtaining a platy $TiO_2$—$SiO_2$ glass block of 30 mm×30 mm×1 mm. Helium-neon laser light is vertically applied to the plane of 30 mm×30 mm of this glass block by a Fizeau interferometer, and, a distribution of the refractive index within a plane of, for example, 2 mm×2 mm is examined. Thus the fluctuation width ($\Delta n$) of the refractive index can be measured.

Simply, the $\Delta n$ is determined by the following method. The Sn concentration, the Ti concentration and the Si concentration can be measured by a fundamental parameter method with the use of fluorescent X-ray analysis (using an X-ray analyzer ZSX100e, manufactured by Rigaku Denki Kogyo Co., Ltd.). The $\Delta n$ was derived from a difference between the maximum value and the minimum value obtained by carrying out the measurements of the concentration at 6×6 points with an X-ray irradiation area of 3-mm diameter at an interval of 2 mm within an area of 10 mm×10 mm and converting each of the Sn concentration, the Ti concentration and the Si concentration in each of the measurement points to an absolute refractive index according to formula (1).

In the invention, a coefficient of thermal expansion in the temperature range of from 0 to 100° C. (hereinafter referred to as "$CTE_{0-100}$") is preferably from −150 ppb/° C. to 150 ppb/° C. When an absolute value of the coefficient of thermal expansion exceeds 150 ppb/° C., in the case where an extremely low coefficient of thermal expansion is required as in, for example, an optical member of an exposure tool for EUVL, there may be a case where the thermal expansion cannot be neglected. The $CTE_{0-100}$ is preferably from −100 ppb/° C. to 100 ppb/° C. Similarly, a coefficient of thermal expansion in the temperature range of from −50 to 150° C. (hereinafter referred to as "$CTE_{-50-150}$") is preferably from −200 ppb/° C. to 200 ppb/° C., and more preferably from −150 ppb/° C. to 150 ppb/° C.

Also, in an optical member of an exposure tool for EUVL, an average coefficient of thermal expansion of the glass at 22.0° C. (hereinafter referred to as "$CTE_{22}$") is preferably from −30 ppb/° C. to 30 ppb/° C., more preferably from −20 ppb/° C. to 20 ppb/° C., further preferably from −10 ppb/° C. to 10 ppb/° C., and especially preferably from −5 ppb/° C. to 5 ppb/° C.

In carrying out EUVL, for the purpose of preventing a dimensional change of an optical member within an exposure tool, such as a mask substrate and a mirror, the temperature within the exposure tool for EUVL is strictly controlled such that it is 22±3° C. In this state, the temperature of the optical member placed within the exposure tool for EUVL is 22±3° C. However, it is suggested that the temperature of the optical member locally rises because EUV light with high energy is irradiated. Accordingly, when a temperature width in which the coefficient of thermal expansion is from −5 ppb/° C. to 5 ppb/° C. is great, the energy of the EUV light to be irradiated can be raised, and therefore it becomes possible to improve the throughput. For that reason, the temperature width in which the coefficient of thermal expansion is from −5 ppb/° C. to 5 ppb/° C. is preferably 4.0° C. or greater, more preferably 4.5° C. or greater, further preferably 5.0° C. or greater, and especially preferably 5.5° C. or greater.

The coefficient of thermal expansion can be measured at a temperature in the range of from −150 to 200° C. by using, for example, a laser interferometric dilatometer (LIX-1, manufactured by ULVAC-RIKO, Inc.). In order to increase the precision for measuring the coefficient of thermal expansion, a method in which the plurality of measurement is carried out and the measured coefficients of thermal expansion are averaged, is effective. The temperature width in which the coefficient of thermal expansion is from −5 ppb/° C. to 5 ppb/° C. can be derived by determining an area of the temperature at which the coefficient of thermal expansion is from −5 ppb/° C. to 5 ppb/° C. from a curve of the coefficient of thermal expansion obtained by the measurement.

In the invention, a $Ti^{3+}$ concentration is preferably 100 ppm by mass or less in terms of $TiO_2$. When the $Ti^{3+}$ concentration exceeds 100 ppm by mass in terms of $TiO_2$, brown coloration arises, and the internal transmittance $T_{400-700}$ is reduced. Thus, there is a concern that the glass is not suitable for a material which is required to have transparency. The $Ti^{3+}$ concentration is preferably 70 ppm by mass, more preferably 50 ppm by mass or less, and especially preferably 20 ppm by mass or less.

The $Ti^{3+}$ concentration can be determined by means of electron spin resonance (ESR) measurement. For example, the measurement conditions are as follows.

Frequency: Near 9.44 GHz (X-band)
Output: 4 mW
Modulated magnetic field: 100 kHz, 0.2 mT
Measurement temperature: Room temperature
ESR species integration range: 332 to 368 mT
Sensitivity calibration: Carried out at an $Mn^{2+}$/MgO peak height in a certain amount Also, the $Ti^{3+}$ concentration can be calculated roughly from an absorption coefficient at 500 nm. It has been found that an absorption coefficient $Abs_{500}$ which is converted from the internal transmittance at 500 nm and the $Ti^{3+}$ concentration have the following relationship.

$$Ti^{3+}(\text{ppm by mass}) = Abs_{500}(cm^{-1}) \times 30 \quad (2)$$

Accordingly, the $Ti^{3+}$ concentration can be calculated on the basis of the results of the measurement of the internal transmittance according to the foregoing formula (2).

In the invention, it is preferred that a fictive temperature is 1,200° C. or lower. When the fictive temperature exceeds 1,200° C., the temperature range of zero expansion is narrow, and thus, there is a concern that the glass is not suitable for a material to be used for an optical member of an exposure tool for EUVL. The fictive temperature is preferably 1,100° C. or lower, more preferably 1,000° C. or lower, and especially preferably 900° C. or lower.

In order to obtain such a fictive temperature in the invention, there is a method, for example, in which the glass material is held at a temperature of from 600 to 1,200° C. for 5 hours or more, and then the temperature is decreased to 500° C. or lower at an average temperature decrease rate of 100° C./hr or less.

The fictive temperature can be measured as follows. With respect to a mirror-polished $TiO_2$—$SiO_2$ glass, an absorption spectrum is obtained by an infrared spectrometer (Magna 760, manufactured by Nikolet Company). In this measurement, a data-taking interval is set up at about 0.5 $cm^{-1}$, and an average value obtained by scanning 64 times is employed for the absorption spectrum. In the thus obtained infrared absorption spectrum, a peak observed in the vicinity of 2,260 $cm^{-1}$ is attributed to an overtone of stretching vibration by an Si—O—Si bond of the $TiO_2$—$SiO_2$ glass. A calibration curve is prepared from a glass of the same composition having a known fictive temperature, and then the fictive temperature is determined by a calibration curve and this peak position. Alternatively, a reflection spectrum of the surface is measured in the same manner by using the same infrared spectrometer. In the thus obtained infrared reflection spectrum, a peak observed in the vicinity of about 1,120 $cm^{-1}$ is attributed to stretching vibration by an Si—O—Si bond of the $TiO_2$—$SiO_2$ glass. A calibration curve is prepared from a glass of the same composition having a known fictive temperature, and then the fictive temperature is determined by a calibration curve and this peak position.

In the invention, it is preferred that an OH concentration is 600 ppm by mass or less. When the OH concentration exceeds 600 ppm by mass, the transmittance in a wavelength band of a near infrared region is reduced due to the absorption attributed to the OH group, and thus, there is a concern that the $T_{400-3000}$ is less than 70%. The OH concentration is more preferably 400 ppm by mass or less, further preferably 200 ppm or less by mass, and especially preferably 100 ppm by mass or less.

The OH concentration of the $TiO_2$—$SiO_2$ glass can be measured by using a known method. For example, the OH concentration can be determined from an absorption peak at a wavelength of 2.7 μm through the measurement with the use of an infrared spectrometer (see J. P. Williams, et al., *American Ceramic Society Bulletin*, 55(5), 524, 1976). The detection limit by this method is 0.1 ppm.

In order to manufacture the glass of the invention, the following manufacturing method can be employed.

(a) Porous Glass Body Formation Step:

$TiO_2$—$SiO_2$ glass fine particles obtained through flame hydrolysis of an Si precursor and a Ti precursor, each of which serves as a glass-forming raw material, are deposited and grown on a substrate, thereby forming a porous $TiO_2$—$SiO_2$ glass body. The glass-forming raw material is not particularly limited so far as it is a raw material capable of being gasified. Examples of the Si precursor include silicon halides such as chlorides (for example, $SiCl_4$, $SiHCl_3$, $SiH_2Cl_2$, $SiH_3Cl$, etc.), fluorides (for example, $SiF_4$, $SiHF_3$, $SiH_2F_2$, etc.), bromides (for example, $SiBr_4$, $SiHBr_3$, etc.) and iodides (for example, $SiI_4$, etc.); and alkoxysilanes represented by $R_nSi(OR)_{4-n}$ (wherein R represents an alkyl group having from 1 to 4 carbon atoms; n represents an integer of from 0 to 3; and plural R may be the same or different). Also, examples of the Ti precursor include titanium halides (for example, $TiCl_4$, $TiBr_4$, etc.); and titanium alkoxides represented by $R_nTi(OR)_{4-n}$ (wherein R represents an alkyl group having from 1 to 4 carbon atoms; n represents an integer of from 0 to 3; and plural R may be the same or different). Also, as the Si precursor and the Ti precursor, a compound of Si and Ti such as a silicon titanium double alkoxide can be used.

A seed rod made by silica glass (for example, seed rods disclosed in JP-B-63-24973) can be used as the substrate. Also, the substrate to be used is not limited to a rod form but may be in a plate form.

In the case of incorporating Sn in the $TiO_2$—$SiO_2$ glass of the invention, there are several processes including a soot process, a solution soaking process and the like.

The case of incorporating Sn in the $TiO_2$—$SiO_2$ glass of the invention through a soot process is hereunder described.

(b) Sn-Containing Porous Glass Body Formation Step:

$SnO_2$—$TiO_2$—$SiO_2$ glass fine particles obtained through flame hydrolysis of an Si precursor, a Ti precursor and an Sn precursor, each of which serves as a glass-forming raw material, are deposited and grown on a substrate, thereby forming a porous $SnO_2$—$TiO_2$—$SiO_2$ glass body. The glass-forming raw material is not particularly limited so far as it is a raw material capable of being gasified.

Examples of the Si precursor include silicon halides such as chlorides (for example, $SiCl_4$, $SiHCl_3$, $SiH_2Cl_2$, $SiH_3Cl$, etc.), fluorides (for example, $SiF_4$, $SiHF_3$, $SiH_2F_2$, etc.), bromides (for example, $SiBr_4$, $SiHBr_3$, etc.) and iodides (for example, $SiI_4$, etc.); and alkoxysilanes represented by $R_nSi(OR)_{4-n}$ (wherein R represents an alkyl group having from 1 to 4 carbon atoms; n represents an integer of from 0 to 3; and plural R may be the same or different).

Also, examples of the Ti precursor include titanium halides (for example, $TiCl_4$, $TiBr_4$, etc.); and titanium alkoxides represented by $R_nTi(OR)_{4-n}$ (wherein R represents an alkyl group having from 1 to 4 carbon atoms; n represents an integer of from 0 to 3; and plural R may be the same or different). Also, as the Si precursor and the Ti precursor, a compound of Si and Ti such as a silicon titanium double alkoxide can be used.

Also, examples of the Sn precursor include tin halides (for example, $SnCl_4$, $SnBr_4$, etc.) and tin alkoxides represented by $R_nSn(OR)_{4-n}$ (wherein R represents an alkyl group having from 1 to 4 carbon atoms; n represents an integer of from 0 to 3; and plural R may be the same or different). Also, as the Si precursor and the Sn precursor, a compound of Si and Sn such as a silicon tin double alkoxide can be used.

A seed rod made by silica glass (for example, seed rods disclosed in JP-B-63-24973) can be used as the substrate. Also, the substrate to be used is not limited to a rod form but may be in a plate form.

(c) Sn Solution Soaking Step:

Next, the case of incorporating Sn in the $TiO_2$—$SiO_2$ glass body, thereby obtaining a porous $SnO_2$—$TiO_2$—$SiO_2$ glass body through a solution soaking process is hereunder described. In that case, the porous $TiO_2$—$SiO_2$ glass body obtained through a soot process is soaked with a solution of an Sn compound such as an Sn chloride and an Sn alkoxide through a solution soaking process, and then dried to remove the solvent, and the resulting glass body is heated to a transparent vitrification temperature, thereby obtaining a porous $SnO_2$—$TiO_2$—$SiO_2$ glass body. As the Sn chloride, for example, tin tetrachloride ($SnCl_4$) can be used.

Examples of the solvent which can be used for preparing a solution of an Sn chloride, an Sn alkoxide or the like include methanol, ethanol, isopropanol, toluene, normal hexane, benzene and xylene. In the case of an Sn alkoxide, it is preferred to use toluene or xylene having small polarity, or normal hexane or benzene having no polarity. For the purpose of preventing a reaction with moisture in air from occurring, it is preferred to carry out the soaking of the Sn alkoxide in an inert atmosphere of nitrogen, etc., and the dew point of the atmosphere is preferably made lower than 0° C.

The soaking time is properly chosen depending upon the concentration of a solute and is preferably 4 hours or more. When the soaking time is less than 4 hours, the solution does not penetrate into the inside of the porous $TiO_2$—$SiO_2$ glass body, and thus, there is a concern that the obtained glass is heterogeneous.

The soaking may be carried out under a normal pressure or a reduced pressure. When the soaking is carried out under a reduced pressure, it is possible to shorten the time for penetrating the solution into the inside of the porous $TiO_2$—$SiO_2$ glass body. In the case where the pressure reduction is carried out, the pressure is preferably 13,000 Pa or lower. The temperature for removing the solvent is properly chosen depending upon the kind of the solvent and is preferably 100° C. or higher.

Also, the removal of the solvent may be carried out under a normal pressure or a reduced pressure. In the case where the removal of the solvent is carried out under a reduced pressure, the pressure is preferably 13,000 Pa or lower. The solvent can be removed by drying immediately after completion of the soaking with a solution. It is preferred that the porous glass body which has been taken out from the solvent is left at rest in an atmosphere having the dew point of 0° C. or higher, followed by removing the solvent. By utilizing such a method, a hydrolysis reaction between the Sn alkoxide and Si—OH in the inside of the glass body is accelerated. For that reason, the residual amount of the Sn element can be increased and also the occurrence of the segregation of the Sn element can be suppressed. The time for leaving the porous glass body at rest is preferably 24 hours or more. In order to accelerate the hydrolysis, an ammonium gas, a hydrochloric acid gas or the like may be introduced in the atmosphere.

(d) Oxygen Treatment Step:

The porous $TiO_2$—$SiO_2$ glass body obtained in the porous glass body formation step, or the porous $SnO_2$—$TiO_2$—$SiO_2$ glass body obtained in the Sn-containing porous glass body formation step or the Sn solution soaking step, is held in an atmosphere containing 15% by volume or higher of oxygen to obtain a porous $TiO_2$—$SiO_2$ glass body having been subjected to an oxygen treatment. At that time, in order to improve the transmittance, it is preferred that the oxygen concentration is high. The oxygen concentration is preferably 50% by volume or higher, more preferably 70% by volume or higher, and especially preferably 90% by volume or higher. It is preferred to carry out the oxygen treatment under a pressure of about 1 atm for several ten minutes to several ten hours at a high temperature in such an atmosphere.

When the treatment temperature is raised too much, there is a possibility that the densification of the porous glass body proceeds and bubbles after the vitrification are formed. Accordingly, it is not preferred that the treatment temperature is raised too much. Also, when the treatment temperature is low, the effect for improving the transmittance is low. For that reason, the treatment is carried out preferably in the range of from 500° C. or higher to 1,300° C. or lower, more preferably in the range of from 800° C. or higher to 1,250° C. or lower, and especially preferably in the range of from 900° C. or higher to 1,200° C. or lower.

In particular, in the case where the Sn-containing porous glass body formation step or the Sn solution soaking step has not been carried out, when the vitrification is carried out by means of a densification step without carrying out the oxygen treatment step, coloration of the glass is caused. Accordingly, it is preferred that the vitrification is carried out without omitting the oxygen treatment step. Also, after the porous glass body formation step, the densification step can be carried out without carrying out the Sn-containing porous glass body formation step or the Sn solution soaking step. In the case where it is intended to more increase the transmittance, it is preferred that the oxygen treatment step is carried out.

(e) Densification Step:

The porous $TiO_2$—$SiO_2$ glass body or the porous $SnO_2$—$TiO_2$—$SiO_2$ glass body obtained in the porous glass body formation step, the Sn-containing porous glass body formation step or the Sn solution soaking step, or the porous $TiO_2$—$SiO_2$ glass body or the porous $SnO_2$—$TiO_2$—$SiO_2$ glass body having been subjected to an oxygen treatment, which is obtained in the oxygen treatment step, is heated to a densification temperature to obtain a $TiO_2$—$SiO_2$ dense body which does not substantially contain bubbles or air bubbles, or an $SnO_2$—$TiO_2$—$SiO_2$ dense body which does not substantially contain bubbles or air bubbles. The densification temperature in the present specification refers to a temperature at which a porous glass body can be densified until no void can be confirmed by an optical microscope. The densification temperature is preferably from 1,100 to 1,750° C., and more preferably from 1,200 to 1,550° C.

In the case of a normal pressure, the atmosphere is preferably an atmosphere of 100% of an inert gas such as helium, or an atmosphere containing, as a main member, an inert gas such as helium. In the case of a reduced pressure, the atmosphere is not particularly limited.

(f) Vitrification Step:

The $TiO_2$—$SiO_2$ dense body or the $SnO_2$—$TiO_2$—$SiO_2$ dense body obtained in the densification step is heated to a vitrification temperature to obtain a glass body with high transmittance which does not substantially contain a crystal member. The vitrification temperature is preferably from 1,400 to 1,750° C., and more preferably from 1,500 to 1,700° C.

The atmosphere is not particularly limited. But, similar to the atmosphere in the densification step, namely, in the case of a normal pressure, the atmosphere is preferably an atmosphere of 100% of an inert gas such as helium, or an atmosphere containing, as a main member, an inert gas such as helium. Also, in the case of a reduced pressure, the densification step and the vitrification step can be carried out at the same time.

In order to form the glass of the invention, the following process can be further employed.

(g) Forming Step:

The glass body with high transmittance obtained in the vitrification step is heated to a forming temperature to obtain a formed glass body having been formed into a desired shape. The forming temperature is preferably from 1,500 to 1,750° C. When the forming temperature is lower than 1,500° C., since the viscosity of the glass is high, deformation due to own weight may not substantially proceed; and there is a concern that the growth of cristobalite which is a crystal phase of $SiO_2$, the growth of rutile or anatase which is a crystal phase of $TiO_2$, or the growth of cassiterite which is a crystal phase of $SnO_2$ occurs, thereby causing the generation of so-called devitrification. When the forming temperature exceeds 1,750° C., there is a possibility that sublimation of $SiO_2$ or reduction of $TiO_2$ is caused.

Also, when the $TiO_2$—$SiO_2$ dense body or the $SnO_2$—$TiO_2$—$SiO_2$ dense body obtained in the densification step is subjected to a forming step without carrying out a vitrification step, the vitrification step can be omitted. That is, vitrification and forming can be carried out at the same time in the forming step. The atmosphere is not particularly limited.

In order to subject the glass of the invention to slow cooling and to control the fictive temperature, the following process can be employed.

(h) Annealing Step:

The fictive temperature of the glass is controlled by carrying out an annealing treatment including holding the glass body with high transmittance obtained in the vitrification step or the formed glass body obtained in the forming step at a temperature of from 600 to 1,200° C. for 5 hours or more and then cooling it to a temperature of 500° C. or lower at an average temperature decrease rate of 100° C./hr or less. Alternatively, the fictive temperature of the glass is controlled by carrying out an annealing treatment including, in a temperature-decreasing step from a temperature of 1,200° C. or higher in the vitrification step or the forming step, cooling the obtained glass body with high transmittance or the obtained formed glass body from 1,200° C. to 500° C. at an average temperature decrease rate of 100° C./hr or less. In such cases, the average temperature decrease rate is more preferably 50° C./hr or less, and further preferably 10° C./hr or less. Also, after cooling the glass body to a temperature of 500° C. or lower, natural cooling can be adaptable. The atmosphere is not particularly limited.

EXAMPLES

The invention is hereunder described in more detail with reference to the following Examples, but it should not be construed that the invention is limited thereto.

Example 1

$SnO_2$—$TiO_2$—$SiO_2$ glass fine particles obtained by gasifying each of $TiCl_4$, $SiCl_4$ and $SnCl_4$, each serving as a glass-forming raw material, and mixing them and then subjecting the mixture to heat hydrolysis (flame hydrolysis) in an oxyhydrogen flame were deposited and grown on a substrate, to form a porous $SnO_2$—$TiO_2$—$SiO_2$ glass body having a diameter of about 75 mm and a length of about 95 mm (Sn-containing porous glass body formation step). In the Sn-containing porous glass body formation step, the feed amount of $SnCl_4$ was set up at $7.73 \times 10^{-4}$ g/L relative to the total hydrogen feed amount.

The obtained porous $SnO_2$—$TiO_2$—$SiO_2$ glass body was difficult to handle without any treatment, and therefore, this porous glass body was kept in air at 1,200° C. for 4 hours in a state that it was deposited on the substrate and then separated from the substrate.

Thereafter, the thus separated porous glass body was held in an atmosphere consisting of 80% by volume of a helium gas and 20% by volume of oxygen at 1,450° C. for 4 hours to obtain an $SnO_2$—$TiO_2$—$SiO_2$ dense body (densification step).

The obtained $SnO_2$—$TiO_2$—$SiO_2$ dense body was kept in an air atmosphere at 1,650° C. for 4 hours to obtain a glass body with high transmittance (vitrification step).

The obtained glass body with high transmittance was set in a Pt crucible, heated in an air atmosphere at 1,650° C. and formed in a block shape, to obtain a formed glass body (forming step).

Example 2

$SnO_2$—$TiO_2$—$SiO_2$ glass fine particles obtained by gasifying each of $TiCl_4$, $SiCl_4$ and $SnCl_4$, each serving as a glass-forming raw material, and mixing them and then subjecting the mixture to heat hydrolysis (flame hydrolysis) in an oxyhydrogen flame were deposited and grown on a substrate, to form a porous $SnO_2$—$TiO_2$—$SiO_2$ glass body having a diameter of about 75 mm and a length of about 95 mm (Sn-containing porous glass body formation step). In the Sn-containing porous glass body formation step, the feed amount of $SnCl_4$ was set up at $7.73 \times 10^{-4}$ g/L relative to the total hydrogen feed amount.

The obtained Sn-containing porous $SnO_2$—$TiO_2$—$SiO_2$ glass body was difficult to handle without any treatment, and therefore, this porous glass body was kept in air at 1,200° C. for 4 hours in a state that it was deposited on the substrate and then separated from the substrate.

Thereafter, the thus separated porous glass body was held in an atmosphere of 100% He at 1,450° C. for 4 hours to obtain an $SnO_2$—$TiO_2$—$SiO_2$ dense body (densification step).

The obtained $SnO_2$—$TiO_2$—$SiO_2$ dense body was kept in an atmosphere of 100% Ar at 1,650° C. for 4 hours to obtain a glass body with high transmittance (vitrification step).

The obtained glass body with high transmittance was set in a carbon mold, heated in an atmosphere of 100% Ar at 1,650° C. and formed in a block shape, to obtain a formed glass body (forming step).

Example 3

$SnO_2$—$TiO_2$—$SiO_2$ glass fine particles obtained by gasifying each of $TiCl_4$, $SiCl_4$ and $SnCl_4$, each serving as a glass-forming raw material, and mixing them and then subjecting the mixture to heat hydrolysis (flame hydrolysis) in an oxyhydrogen flame were deposited and grown on a substrate, to form a porous $SnO_2$—$TiO_2$—$SiO_2$ glass body having a diameter of about 80 mm and a length of about 100 mm (Sn-containing porous glass body formation step). In the Sn-containing porous glass body formation step, the feed amount of $SnCl_4$ was set up at $1.55 \times 10^{-3}$ g/L relative to the total hydrogen feed amount.

The obtained porous $SnO_2$—$TiO_2$—$SiO_2$ glass body was difficult to handle without any treatment, and therefore, this porous glass body was kept in air at 1,200° C. for 4 hours in a state that it was deposited on the substrate and then separated from the substrate.

Thereafter, the thus separated porous glass body was held in an atmosphere of 100% He at 1,450° C. for 4 hours to obtain an $SnO_2$—$TiO_2$—$SiO_2$ dense body (densification step).

The obtained $SnO_2$—$TiO_2$—$SiO_2$ dense body was kept in an atmosphere of 100% Ar at 1,650° C. for 4 hours to obtain a glass body with high transmittance (vitrification step).

The obtained glass body with high transmittance was set in a carbon mold, heated in an atmosphere of 100% Ar at 1,650° C. and formed in a block shape, to obtain a formed glass body (forming step).

Example 4

ULE #7972 manufactured by Corning Incorporated, which is known as a zero-expansion $TiO_2$—$SiO_2$ glass, was used.

Example 5

$TiO_2$—$SiO_2$ glass fine particles obtained by gasifying each of $TiCl_4$ and $SiCl_4$, each serving as a glass-forming raw material, and mixing them and then subjecting the mixture to heat hydrolysis (flame hydrolysis) in an oxyhydrogen flame were deposited and grown on a substrate, to form a porous $TiO_2$—$SiO_2$ glass body having a diameter of about 250 mm and a length of about 1,000 mm (porous glass body formation step).

The obtained porous $TiO_2$—$SiO_2$ glass body was difficult to handle without any treatment, and therefore, this porous glass body was kept in air at 1,200° C. for 4 hours in a state that it was deposited on the substrate and then separated from the substrate.

Thereafter, the thus separated porous glass body was held under a reduced pressure at 1,450° C. for 4 hours to obtain a $TiO_2$—$SiO_2$ dense body (densification step).

The obtained $TiO_2$—$SiO_2$ dense body was set in a carbon mold and held at 1,700° C. for 10 hours, to obtain a formed glass body with high transmittance (forming step).

The obtained formed glass body was cooled from 1,200° C. to 500° C. at 100° C./hr in a temperature-decreasing process in the foregoing forming step and then allowed to stand for cooling to room temperature (annealing step).

Example 6

$SnO_2$—$TiO_2$—$SiO_2$ glass fine particles obtained by gasifying each of $TiCl_4$, $SiCl_4$ and $SnCl_4$, each serving as a glass-forming raw material, and mixing them and then subjecting the mixture to heat hydrolysis (flame hydrolysis) in an oxyhydrogen flame are deposited and grown on a substrate, to form a porous $SnO_2$—$TiO_2$—$SiO_2$ glass body having a diameter of about 75 mm and a length of about 95 mm (Sn-containing porous glass body formation step). In the Sn-containing porous glass body formation step, the feed amount of $SnCl_4$ is set up at $1.55 \times 10^{-3}$ g/L relative to the total hydrogen feed amount.

The obtained porous $SnO_2$—$TiO_2$—$SiO_2$ glass body is difficult to handle without any treatment, and therefore, this porous glass body is kept in air at 1,200° C. for 4 hours in a state that it is deposited on the substrate and then separated from the substrate.

Thereafter, the thus separated porous glass body is held in an atmosphere consisting of 80% by volume of a helium gas and 20% by volume of oxygen at 1,450° C. for 4 hours to obtain an $SnO_2$—$TiO_2$—$SiO_2$ dense body (densification step).

The obtained $SnO_2$—$TiO_2$—$SiO_2$ dense body is held in an air atmosphere at 1,650° C. for 4 hours, to obtain a glass body with high transmittance (vitrification step).

The obtained glass body with high transmittance is set in a Pt crucible, heated in an air atmosphere at 1,650° C. and formed in a block shape, to obtain a formed glass body (forming step).

The measurement results of respective physical properties of the glasses prepared in the foregoing Examples 1 to 6 are shown in Tables 1 to 3. As for the evaluation methods, each was evaluated according to the measuring methods described above. Here, Examples 1 to 3 and 6 are examples of the invention, and Examples 4 and 5 are comparative examples.

TABLE 1

|  | $TiO_2$ (% by mass) | $T_{400-700}$ (%) | $T_{400-3000}$ (%) | $SnO_2$ (% by mass) | $Ti^{3+}$ concentration (ppm by mass) | $\Delta SnO_2$ (% by mass) | $Sn^{2+}/(Sn^{2+}+Sn^{4+})$ |
|---|---|---|---|---|---|---|---|
| Example 1 | 7.1 | 99.3 | 92.6 | 0.1 | ND | 0.02 | <0.2 |
| Example 2 | 6.2 | 98.3 | 97.0 | 0.3 | ND | 0.06 | — |
| Example 3 | 10.4 | 98.3 | 91.9 | 0.5 | ND | 0.18 | — |
| Example 4 | 7.0 | 95.9 | 12.6 | 0.0 | 1 | — | — |
| Example 5 | 6.6 | 93.6 | 88.5 | 0.0 | 7 | — | — |
| Example 6 | 4.5 | 98.8 | 92.1 | 1.2 | ND | 0.09 | 0.17 |

TABLE 2

|  | $\Delta n$ ($\times 10^{-4}$) | Fictive temperature (° C.) | OH concentration (ppm by mass) |
|---|---|---|---|
| Example 1 | 0.7 | 940 | 40 |
| Example 2 | 2.2 | 968 | 40 |
| Example 3 | 5.8 | 1226 | 40 |
| Example 4 | 3.5 | 900 | 880 |
| Example 5 | 4.0 | 891 | 30 |
| Example 6 | 1.9 | 960 | 40 |

TABLE 3

| | Coefficient of thermal expansion in the temperature range of from 0 to 100° C. $CTE_{0-100}$ [ppb/° C.] [(Minimum value) to (Maximum value)] | Coefficient of thermal expansion in the temperature range of from −50 to 150° C. $CTE_{-50-150}$ [ppb/° C.] [(Minimum value) to (Maximum value)] | Temperature width in which the coefficient of thermal expansion is 0 ± 5 ppb/° C. [° C.] |
|---|---|---|---|
| Example 1 | From −54 to 87 | From −234 to 108 | 5.9 |
| Example 2 | From −21 to 143 | From −174 to 163 | 5.7 |
| Example 3 | From −207 to −66 | From −411 to 8 | — |
| Example 4 | From 30 to 145 | From −105 to 145 | 4.0 |
| Example 5 | From −69 to 109 | From −268 to 115 | 5.2 |
| Example 6 | From −30 to 100 | From −190 to 125 | 4.5 |

Example 1 is concerned with an $SnO_2$—$TiO_2$—$SiO_2$ glass, and the result is as follows. The $T_{400-700}$ was 97% or more, the $T_{400-3000}$ was 90% or more, and the coefficient of thermal expansion in a temperature region of from 0 to 100° C. fell within the range of from −150 ppb/° C. to 150 ppb/° C.

Example 2 is concerned with an $SnO_2$—$TiO_2$—$SiO_2$ glass, and the result is as follows. The $T_{400-700}$ was 97% or more, the $T_{400-3000}$ was 95% or more, and the coefficient of thermal expansion in a temperature region of from 0 to 100° C. fell within the range of from −150 ppb/° C. to 150 ppb/° C.

Example 3 is concerned with an $SnO_2$—$TiO_2$—$SiO_2$ glass, and the result is as follows. The $T_{400-700}$ was 97% or more, and the $T_{400-3000}$ was 90% or more.

Example 4 is concerned with a $TiO_2$—$SiO_2$ glass, and the result is as follows. The $Ti^{3+}$ content was high, the $T_{400-700}$ was inferior to that in Examples 1 to 3, and the transmittance $T_{400-3000}$ was inferior to that in Examples 1 to 3.

Example 5 is concerned with a $TiO_2$—$SiO_2$ glass, and the result is as follows. The $Ti^{3+}$ content was high, the $T_{400-700}$ was inferior to that in Examples 1 to 3, and the transmittance $T_{400-3000}$ was inferior to that in Examples 1 to 3.

Example 6 is concerned with an $SnO_2$—$TiO_2$—$SiO_2$ glass, and the result is as follows. The $T_{400-700}$ is 97% or more, the $T_{400-3000}$ is 90% or more, and the coefficient of thermal expansion in a temperature region of from 0 to 100° C. falls within the range of from −150 ppb/° C. to 150 ppb/° C.

While the invention has been described in detail and with reference to specific embodiments thereof, it will be apparent to one skill in the art that various changes and modifications can be made therein without departing from the sprit and scope thereof.

This application is based on Japanese patent application No. 2008-106747 filed on Apr. 16, 2008, the entire contents of which are incorporated hereinto by reference. All references cited herein are incorporated in their entirety.

INDUSTRIAL APPLICABILITY

The transparent extremely low thermal expansion glass of the invention having a wide temperature region in which the coefficient of thermal expansion is substantially zero and having an excellent transparency can be extremely favorably utilized as a material of a member constituting an optical system to be used for EUVL.

The invention claimed is:

1. A $TiO_2$-containing silica glass for optical member for EUV lithography, having a $TiO_2$ concentration of from 3 to 14% by mass; containing Sn, in terms of $SnO_2$, in an amount of from 0.01 to 10% by mass; having an internal transmittance per 1-mm thickness in a wavelength region of from 400 to 700nm, $T_{400-700}$, of 98% or more; having a fluctuation width $\Delta SnO_2$ of $SnO_2$ concentration of 0.1% by mass or less within an area of 10 mm×10 mm; and having an internal transmittance per 1-mm thickness in a wavelength region of from 400 to 3,000 nm, $T_{400-3000}$, of 70% or more.

2. The silica glass for optical member for EUV lithography according to claim 1, having a $Ti^{3+}$ concentration, in terms of $TiO_2$, of 100 ppm by mass or less.

3. The silica glass for optical member for EUV lithography according to claim 1, having $Sn^{2+}/(Sn^{2+}+Sn^{4+})$ of 0.5 or less.

4. The silica glass for optical member for EUV lithography according to claim 1, having a fluctuation width ($\Delta n$) of a refractive index of 2x $10^{-3}$ or less within an area of 10 mm x 10 mm in at least one plane.

5. The silica glass for optical member for EUV lithography according to claim 1, having a fluctuation width ($\Delta n$) of a refractive index of 2 x $10^{-3}$ or less within an area of 10 mm x 10 mm in each of two planes orthogonal to each other.

6. The silica glass for optical member for EUV lithography according to claim 1, having a coefficient of thermal expansion in a temperature range of from 0 to 100° C., $CTE_{0-100}$, of from −150 ppb/° C.

7. The silica glass for optical member for EUV lithography according to claim 1, having a temperature width, in which the coefficient of thermal expansion is from −5 ppb/° C. to 5 ppb/° C., of 4.0° C. or greater.

8. The silica glass for optical member for EUV lithography according to claim 1, having a fictive temperature of 1,200° C. or lower.

9. The silica glass for optical member for EUV lithography according to claim 1, having an OH concentration of 600 ppm by mass or less.

10. The $TiO_2$-containing silica glass according to claim 1, having a $TiO_2$ concentration of from 4 to 10% by mass.

11. The silica glass of claim 10, having a $SnO_2$ concentration of from 0.1 to 2% by mass.

12. The silica glass according to claim 10, having a coefficient of thermal expansion in a temperature range of from −50 to 150° C. of from −234 to 163 ppb/° C.

13. The silica glass according to claim 10 having a fictive temperature of 1,000° C. or lower.

14. The silica glass according to claim 10 having a $T_{400-3,000}$ of from 92.1 to 97.0%.

15. The silica glass according to claim 1, having a maximum $CTE_{0-100}$ of 100 ppb/° C.

16. The silica glass according to claim 1, having a $SnO_2$ content of from 0.1 to 0.5% by mass.

* * * * *